(12) United States Patent
Sriram et al.

(10) Patent No.: US 12,482,838 B2
(45) Date of Patent: Nov. 25, 2025

(54) METHOD FOR CHECKING AT LEAST ONE SENSOR WITHIN THE ANODE PATH OF A FUEL CELL SYSTEM

(71) Applicant: Robert Bosch GmbH, Stuttgart (DE)

(72) Inventors: Sriganesh Sriram, Ludwigsburg (DE); Stephan Strahl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 481 days.

(21) Appl. No.: 18/003,571

(22) PCT Filed: Jun. 18, 2021

(86) PCT No.: PCT/EP2021/066580
§ 371 (c)(1),
(2) Date: Dec. 28, 2022

(87) PCT Pub. No.: WO2022/002634
PCT Pub. Date: Jan. 6, 2022

(65) Prior Publication Data
US 2023/0261222 A1    Aug. 17, 2023

(30) Foreign Application Priority Data

Jun. 29, 2020    (DE) .................... 10 2020 208 039.9

(51) Int. Cl.
*H01M 8/0438* (2016.01)
*H01M 8/04089* (2016.01)
(Continued)

(52) U.S. Cl.
CPC ... *H01M 8/04432* (2013.01); *H01M 8/04225* (2016.02); *H01M 8/04228* (2016.02);
(Continued)

(58) Field of Classification Search
CPC ......... H01M 8/04432; H01M 8/04225; H01M 8/04228; H01M 8/04231; H01M 8/04302;
(Continued)

(56) References Cited

U.S. PATENT DOCUMENTS

2008/0220303 A1*    9/2008    Yoshida    ............... H01M 8/0488
                                                                    429/423
2016/0204456 A1*    7/2016    Mueller    ............ H01M 8/04104
                                                                    429/429
(Continued)

FOREIGN PATENT DOCUMENTS

DE    102015200473 A1    7/2016
DE    102015223020 A1    5/2017
(Continued)

OTHER PUBLICATIONS

Translation of International Search Report for Application No. PCT/EP2021/066580 dated Sep. 27, 2021 (2 pages).

*Primary Examiner* — Christian Roldan
(74) *Attorney, Agent, or Firm* — Michael Best & Friedrich LLP

(57) ABSTRACT

The invention relates to a method for checking at least two sensors within an anode path (4) of a fuel cell system (1), having the steps of shutting down the fuel cell system (1); closing the shut-off valve (32) and the purge valve (41); opening an internal valve (34); detecting the pressure values by means of at least two sensors (50, 51, 52, 53, 54) within the anode path; checking whether the pressure values of the at least two sensors (50, 51, 52, 53, 54) differ.

4 Claims, 2 Drawing Sheets

Figure 1:
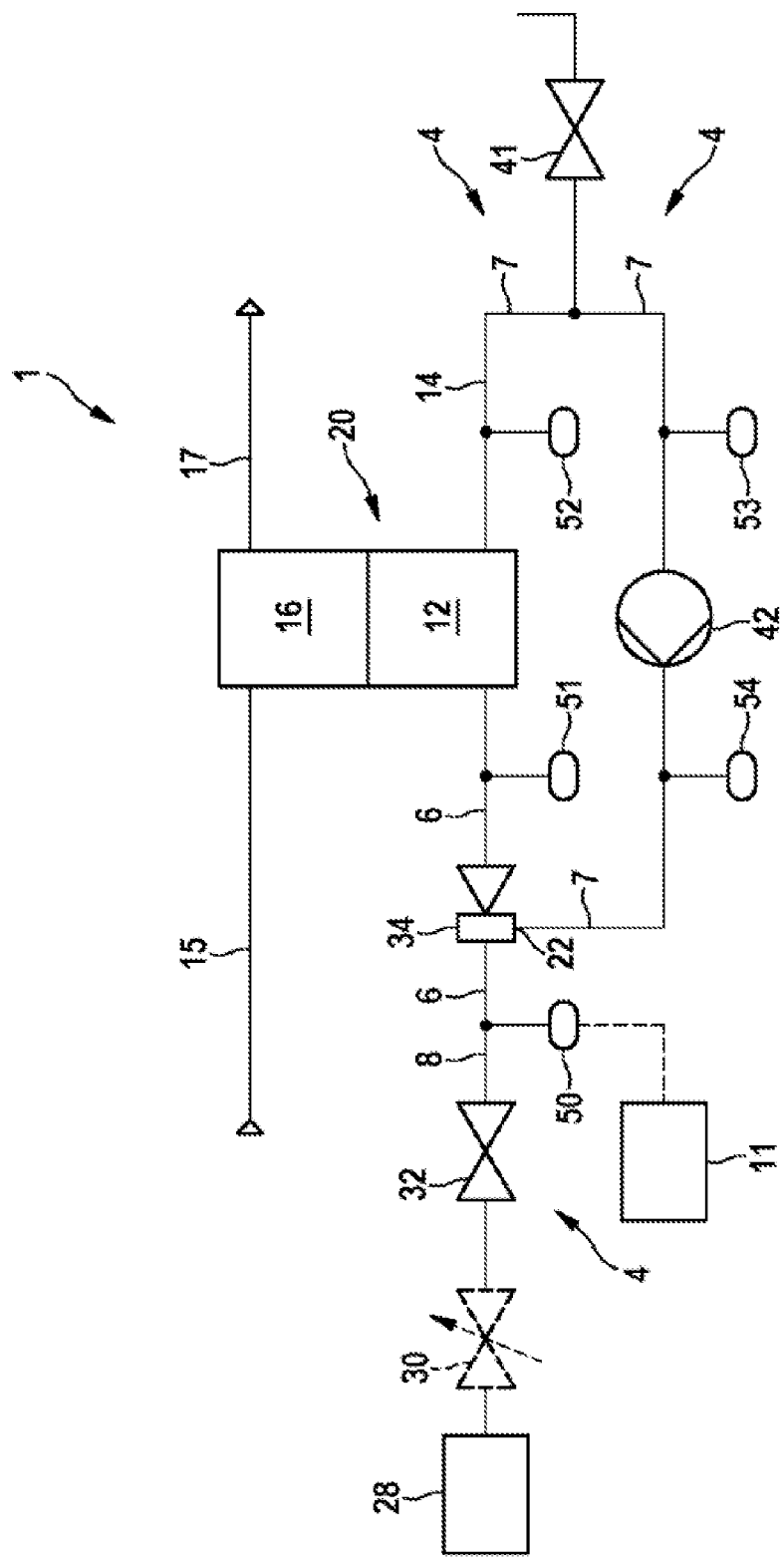

(51) Int. Cl.
  *H01M 8/04223* (2016.01)
  *H01M 8/04225* (2016.01)
  *H01M 8/04228* (2016.01)
  *H01M 8/04302* (2016.01)
  *H01M 8/04303* (2016.01)
  *H01M 8/04746* (2016.01)

(52) U.S. Cl.
  CPC ... *H01M 8/04231* (2013.01); *H01M 8/04302* (2016.02); *H01M 8/04303* (2016.02); *H01M 8/04388* (2013.01); *H01M 8/04753* (2013.01)

(58) Field of Classification Search
  CPC ......... H01M 8/04303; H01M 8/04388; H01M 8/04753; H01M 8/04402; H01M 8/04097; Y02E 60/50
  USPC ........................................................ 429/429
  See application file for complete search history.

(56) References Cited

U.S. PATENT DOCUMENTS

| | | | |
|---|---|---|---|
| 2016/0240875 A1* | 8/2016 | Rama | H01M 8/04761 |
| 2017/0250421 A1* | 8/2017 | Saito | H01M 8/04664 |
| 2018/0331375 A1* | 11/2018 | Egawa | H01M 8/04104 |

FOREIGN PATENT DOCUMENTS

| | | |
|---|---|---|
| EP | 1727227 A1 | 11/2006 |
| JP | 2005227127 A | 8/2005 |
| JP | 2007035445 A | 2/2007 |
| JP | 2012151125 A | 8/2012 |
| JP | 2016533627 A | 10/2016 |
| JP | 2017091625 A | 5/2017 |
| JP | 2018195375 A | 12/2018 |
| WO | 2008019772 A1 | 2/2008 |

* cited by examiner

METHOD FOR CHECKING AT LEAST ONE SENSOR WITHIN THE ANODE PATH OF A FUEL CELL SYSTEM

BACKGROUND OF THE INVENTION

The present invention proceeds from a method as well as a fuel cell system having a measuring arrangement for checking at least one sensor within the anode path of a fuel cell system.

Hydrogen-based fuel cell systems are considered to be the mobility concept of the future since they only emit water as exhaust gas and allow for fast fueling times. Fuel cell systems need air and hydrogen for the chemical reaction within the cells. In order to supply the required amount of energy, the fuel cells arranged within a fuel cell system are interconnected to form so-called fuel cell stacks. Here, the waste heat of the cells is dissipated by means of a cooling circuit and released to the environment. The hydrogen required for operating fuel cell systems is generally provided to the systems from high pressure tanks. For efficiency and component protection reasons, the metering here takes place hyperstoichiometrically. In order not to waste the excess of hydrogen, the unconsumed portion of hydrogen is recirculated within the anode path. The anode gas is typically conveyed back from the anode gas return line via a water separator, a recirculation pump, or a jet pump or the like and, together with fresh hydrogen, is once again fed to the anode. Since nitrogen continuously diffuses during operation of a fuel cell from the cathode side to the anode side and accumulates there, nitrogen must be discharged at regular intervals via a purge valve for sufficient supply of recirculated hydrogen since a continuously lower amount of hydrogen would be conveyed back at a constant flow rate of the recirculation pump otherwise.

SUMMARY OF THE INVENTION

In order to ensure accurate hydrogen metering, a high accuracy of the sensors in the anode path is required.

For checking the function of at least two sensors within an anode path of a fuel cell system, it is advantageous to compare the pressure values of the at least two sensors to one another and to check whether a deviation exists since this is a simple and cost-effective method to check the function of the sensors.

Advantageous embodiments and developments of the fuel cell system according to the invention are specified in the dependent claims.

Reduction of the pressure in the anode path to ambient pressure or a pressure that is between the supply pressure and the ambient pressure is advantageous since a comparison of the pressure values of the individual sensors in this pressure range can be carried out without interfering influences.

Another advantage can be achieved if, as the fuel cell system starts up, the internal valve, in particular the HGI valve, is closed and the shut-off valve is opened, wherein the pressure increase within a predetermined time interval dt at a first sensor within a connecting line between the shut-off valve and the internal valve is compared to an expected pressure curve since the faulty sensor can be identified even in a comparison of only two sensors.

Alternatively, as the fuel cell system starts up, the internal valve, in particular the HGI valve, may be closed and the shut-off valve may be opened, wherein the pressure value measured after a predetermined time interval dt at a first sensor within a connecting line between the shut-off valve and the internal valve is compared to an expected pressure value.

It is advantageous if the time interval dt is selected such that the pressure within the connecting line at the end of the time interval dt does not exceed a pressure value of a maximum of 15-20 bar since the pressure then only needs to be adjusted to a small extent for a subsequent operation of the fuel cell system.

BRIEF DESCRIPTION THE DRAWINGS

Figure 2:
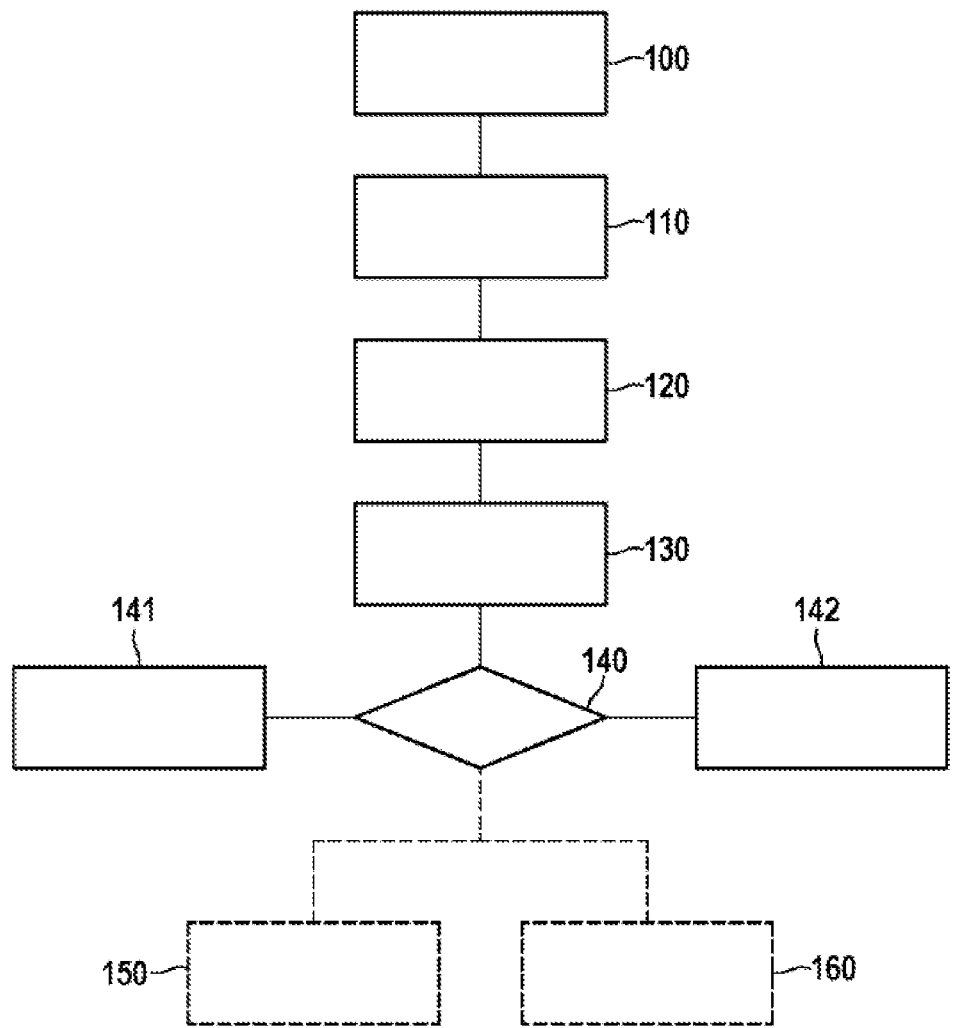

The figures show:

FIG. 1 a schematic illustration of a fuel cell system according to the invention in accordance with a first exemplary embodiment, FIG. 2 a flowchart of the individual steps of a method according to the invention.

DETAILED DESCRIPTION

FIG. 1 shows a schematic illustration of a fuel cell system 1 according to the invention in accordance with a first exemplary embodiment.

Here, the fuel cell system 1 comprises an anode path 4, which is connected to an anode 12 of a fuel cell stack 20. The anode path 4 comprises an anode gas supply line 6 and an anode gas return line 7. The anode gas supply line 6 connects a hydrogen tank 28 to the anode 12 of the fuel cell stack 20.

During operation of the fuel cell system 1, hydrogen is supplied to the anode gas supply line 6 via the hydrogen tank 28. A shut-off valve 32 and an internal valve 34, in particular an HGI valve 34, are arranged within the anode gas supply line 6. The shut-off valve 32 is open during operation of the fuel cell system 1. When the fuel cell system 1 is shut down, the shut-off valve 32 is closed so that hydrogen from the hydrogen tank 28 can no longer flow to the anode 12.

The internal valve 34 is designed as an HGI valve 34 and can meter the amount of hydrogen required depending on the respective operating state of the fuel cell stack 20, to the anode 12.

A connecting line 8 is arranged between the shut-off valve 32 and the internal valve 34. Located in the connecting line 8 is a first sensor 50, which can determine the pressure within the connecting line 8.

A second sensor 51 is arranged in a line section of the anode gas supply line 6 between the internal valve 34 and the anode 12.

In the hydrogen tank 28, the hydrogen is typically stored at high pressure. In order to reduce the pressure, a pressure control valve 30 may be located between the hydrogen tank 28 and the shut-off valve 32 and reduces the pressure before the hydrogen flows to the internal valve 34 or to the anode 12. The pressure at the inlet of the shut-off valve 32, which corresponds to the tank pressure or was reduced by the pressure control valve 30, is referred to as the supply pressure.

The fuel cell system 1 furthermore comprises a cathode gas supply line 15, which supplies air to a cathode 16 of the fuel cell stack 20, and a cathode gas discharge line 17 which discharges the consumed air and exhaust gases from the fuel cell stack 20.

During operation of the fuel cell system 1, hydrogen is delivered to the anode path 4 via the hydrogen tank 28, the shut-off valve 32, and via the internal valve 34 to the anode 12. Since the hydrogen is hyperstoichiometrically fed to the anode 12 for efficiency and component protection reasons, the unconsumed hydrogen is fed back via the anode gas return line 7 and fed back into the anode gas supply line 6 at a hydrogen return point 22.

A recirculation pump 42 may be arranged within the anode gas return line 7. Furthermore, further sensors 52, 53, 54 are arranged within the anode gas return line 7.

Since, during the fuel cell reaction, nitrogen diffuses from the cathode 16 to the anode 12 and accumulates with increasing proportion within the anode path 4 via the anode gas return line 7, the nitrogen accumulated within the anode path 4 must be removed from the fuel cell system 1 from time to time.

This may take place via a purge valve 41 arranged in the anode gas return line 7. In order to discharge an excess of water from the anode 12 or the anode path 4, a water separator, a water reservoir and a drain valve, which are not explicitly shown in the drawing since they are not essential to the invention, can further be arranged within the anode gas return line 7.

The fuel cell system 1 comprises a measuring arrangement for checking at least two sensors 50, 51, 52, 53, 54. The measuring arrangement comprises a control unit 11, which is connected to the at least two sensors 50, 51, 52, 53, 54 in a wired or wireless manner in order to detect measured values, in particular pressure values, and to evaluate them according to the method according to the invention and to check the at least two valves 50, 51, 52, 53, 54 in this way. For reasons of better presentability, FIG. 1 only shows a dashed line, which is to represent the wired or wireless connection between the first sensor 50 and the control unit 11.

The control unit 11 is also connected to further components of the fuel cell system 1. The control unit 11 may also have a connection to the shut-off valve 32 or internal valve 34 in order to actuate them and to detect the time of the opening and closing of the shut-off valve 32 and/or of the internal valve 34 and include it in the calculation of a pressure curve or pressure value.

The control unit 11 can also consist of a plurality of control devices or control units associated with the individual components of the fuel cell system 1.

FIG. 2 shows a flowchart of the individual steps of a method according to the invention for checking the function of at least two sensors within the anode path 4.

In a method step 100, the fuel cell system 1 is shut down. The shutdown may also include a stand-by mode, but an operating mode should exist in which hydrogen is not fed from the hydrogen tank 28 to the anode 12 of the fuel cell stack 20. This takes place by closing the shut-off valve 32.

As the fuel cell system 1 shuts down, the pressure in the anode path 8 is reduced to ambient pressure or a pressure corresponding to a pressure between supply pressure and ambient pressure.

In order to reduce the pressure in the anode path 4, in an exemplary embodiment of the invention, the first shut-off valve 32 at the inlet of the connecting line 8 is closed and the internal valve 34 and the purge valve 41 are opened until the required pressure level is reached.

In a method step 110, the purge valve 41 is closed. The shut-off valve 32 has already been closed as a result of the shutdown of the fuel cell system 1, so that the anode path 4 represents a system closed to the environment. If a connection to the environment or to lines outside the anode path 4 exists through further valves, said valves must also be in a closed state.

In a method step 120, the internal valve 34 is opened so that the exchange of gases within the anode path 4 does not happen as a result of closed valves. If further valves or components, which may prevent the exchange of gases between the individual line sections, are located within the anode path 4, these further valves or components are also opened.

In a method step 130, the pressures are detected by at least two sensors 50, 51, 52, 53, 54 within the anode path 4, and in a method step 140, it is checked whether the pressure values of the at least two sensors 50, 51, 52, 53, 54 differ.

Since the anode path 4 represents a closed system with respect to the environment, and the internal valve 34 as well as all further valves or components are open, the pressure values should be equal when the at least two sensors 50, 51, 52, 53, 54 are fully functional. If a deviation between the pressure values exists, the function of at least one sensor 50, 51, 52, 53, 54 is impaired and a corresponding notification or information takes place in method step 141. A single faulty sensor 50, 51, 52, 53, 54 can be easily identified in the case of more than two sensors 50, 51, 52, 53, 54 within the anode path 4.

If no deviation between the pressure values exists, the function of the at least two sensors 50, 51, 52, 53, 54 is in good condition and a corresponding notification or information takes place in method step 142.

In an optional method step 150, an additional check of the first sensor 50 may be carried out within the connecting line 8. Here, as the fuel cell system 1 starts up, the internal valve 34, in particular the HGI valve 34, is closed and the shut-off valve 32 is opened, wherein the pressure increase within a predetermined time interval dt at a first sensor 50 within the connecting line 8 between the shut-off valve 32 and the HGI valve 34 is compared to an expected pressure curve. If the expected curve of the pressure increase matches the measured pressure increase at the first sensor 50, the function of the sensor 50 is correct, otherwise a fault exists.

In a further optional method step 160, an additional check of the first sensor 50 may be carried out within the connecting line 8. Here, as the fuel cell system starts up, the internal valve 34, in particular the HGI valve 34, is closed and the shut-off valve 32 is opened, wherein the pressure value measured after a predetermined time interval dt at the first sensor 50 within the connecting line 8 between the shut-off valve 32 and the HGI valve 34 is compared to an expected pressure value. If the expected pressure value matches the measured pressure value at the first sensor 50 after the time interval dt, the function of the sensor 50 is correct, otherwise a fault exists.

The time interval dt can be selected such that the pressure within the connecting line 8 at the end of the time interval dt does not exceed a pressure value of a maximum of 15-20 bar.

The invention claimed is:

1. A method for checking a function of at least two sensors within an anode path (4) of a fuel cell system (1), comprising steps of:
  1.) shutting down, via a control unit (11), the fuel cell system (1), wherein
    as the fuel cell system (1) shuts down, a pressure in the anode path (4) is reduced to an ambient pressure or to a pressure between a supply pressure and the ambient pressure;
  2.) closing, via the control unit (11), a purge valve (41);
  3.) opening, via the control unit (11), an internal valve (34), wherein in order to reduce the pressure in the anode path (4), a shut-off valve (32) at an inlet of a connecting line (8) is closed, and the internal valve (34) and a purge valve (41) are opened;

4.) detecting pressure values of at least two sensors (50, 51, 52, 53, 54) within the anode path; and 5.) checking, via the control unit (11), whether the pressure values of the at least two sensors (50, 51, 52, 53, 54) differ; and as the fuel cell system starts up, the internal valve (34) is closed and the shut-off valve (32) is opened, wherein a pressure value measured after a predetermined time interval dt at a first sensor (50) within a connecting line (8) between the shut-off valve (32) and the internal valve (34) is compared to an expected pressure value.

2. The method according to claim 1, wherein as the fuel cell system starts up, the internal valve (34) is closed and the shut-off valve (32) is opened, wherein a pressure increase within a predetermined time interval dt at a first sensor (50) within the connecting line (8) between the shut-off valve (32) and the internal valve (34) is compared to an expected pressure curve.

3. The method according to claim 2, wherein the predetermined time interval dt is selected such that the pressure value measured within the connecting line (8) at an end of the time interval dt does not exceed a pressure value of a maximum of 15-20 bar.

4. A fuel cell system (1) having a measuring arrangement configured for checking at least two sensors (50, 51, 52, 53, 54), wherein the fuel cell system (1) comprises an anode path (4), an anode (12) and an anode gas return line (14), and a connecting line (8) arranged between a first valve (32) and an internal valve (34) within the anode path (4), the fuel cell system comprising:

a sensor (50) configured to detect measured values for determining a current pressure at a position within the connecting line (8) of the anode path (4), wherein as the fuel cell system (1) shuts down, a pressure in the anode path (4) is reduced to an ambient pressure or to a pressure between a supply pressure and the ambient pressure, a control unit (11) configured to check at least one valve within the anode path (4) of the fuel cell system (1) on a basis of the measured values detected by means of the sensor (50), wherein the control unit is configured to control shutting down the fuel cell system (1);

control closing a purge valve (41);

control opening the internal valve (34), wherein in order to reduce the pressure in the anode path (4), a shut-off valve (32) at an inlet of a connecting line (8) is closed, and the internal valve (34) and a purge valve (41) are opened;

receive the pressure values of at least two sensors (50, 51, 52, 53, 54) within the anode path; and check whether the pressure values of the at least two sensors (50, 51, 52, 53, 54) differ; and as the fuel cell system starts up, the internal valve (34) is closed and the shut-off valve (32) is opened, wherein a pressure value measured after a predetermined time interval dt at a first sensor (50) within a connecting line (8) between the shut-off valve (32) and the internal valve (34) is compared to an expected pressure value.

* * * * *